(12) United States Patent
Watanabe

(10) Patent No.: US 7,684,132 B2
(45) Date of Patent: Mar. 23, 2010

(54) LENS BARREL, METHOD FOR FIXING LENS, AND WORKING APPARATUS FOR FIXING LENS

(75) Inventor: Takashi Watanabe, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 459 days.

(21) Appl. No.: 11/605,388

(22) Filed: Nov. 29, 2006

(65) Prior Publication Data
US 2007/0121222 A1 May 31, 2007

(30) Foreign Application Priority Data
Nov. 30, 2005 (JP) ............................. 2005-346330

(51) Int. Cl.
G02B 7/02 (2006.01)
(52) U.S. Cl. ........................ 359/819; 359/813; 359/822
(58) Field of Classification Search ................. 359/813, 359/819, 822; 396/529; 353/101
See application file for complete search history.

(56) References Cited

U.S. PATENT DOCUMENTS 6,657,798 B1 * 12/2003 Kabelevs et al. ............ 359/819

FOREIGN PATENT DOCUMENTS

| JP | 08-327870 A | 12/1996 |
| JP | 2002-196204 A | 7/2002 |

* cited by examiner

Primary Examiner—Joseph Martinez
(74) Attorney, Agent, or Firm—Birch, Stewart, Kolasch & Birch, LLP

(57) ABSTRACT

A third holding barrel is set to a stationary work holder, and a lens frame holding an eighth lens group is set to a movable work holder. The movable work holder is moved to insert the lens frame inside the third holding barrel. In this state, a chart image through the eighth lens group is projected on a screen. While checking the center and clarity of the projected image on the screen, position of the eighth lens group is adjusted. After the position adjustment, an adhesive is injected through openings of the third holding barrel by an injector, thereby fixing the lens frame to the third holding barrel.

5 Claims, 6 Drawing Sheets

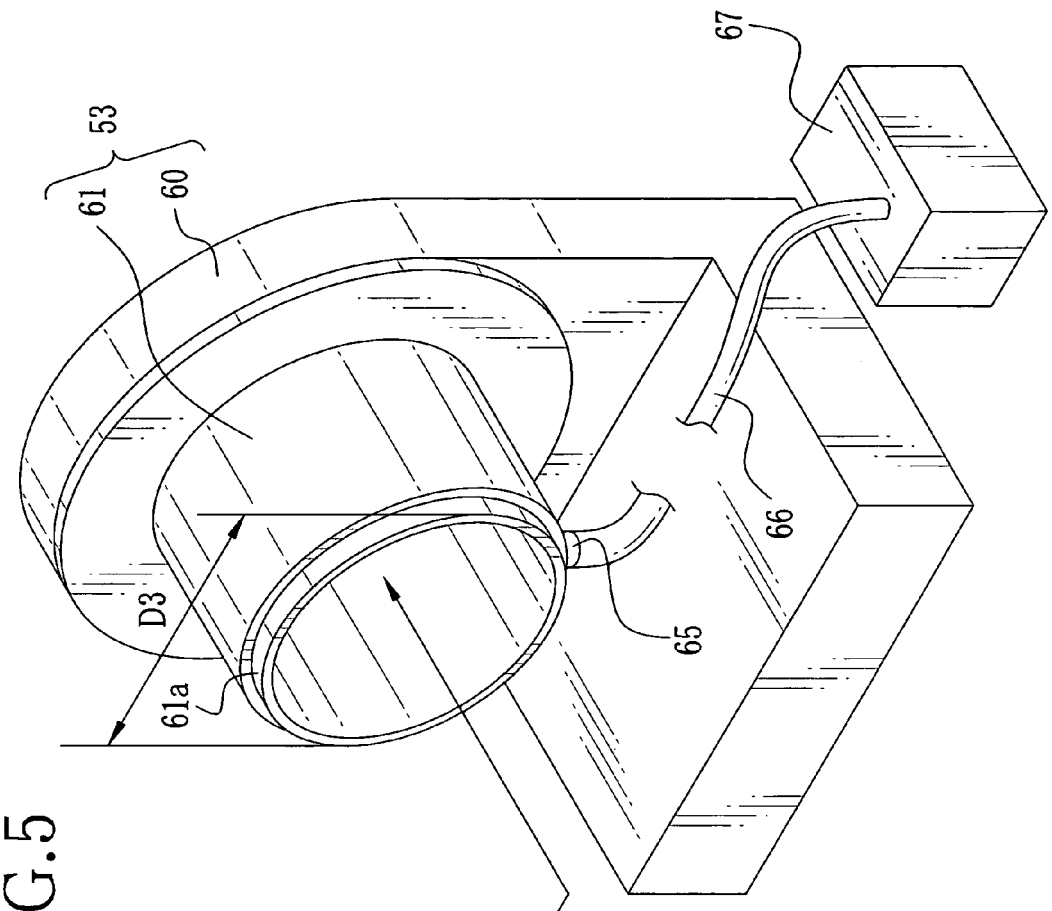
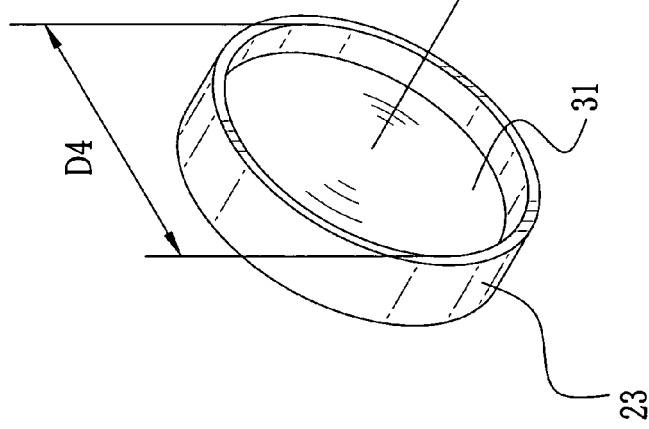
FIG.5

LENS BARREL, METHOD FOR FIXING LENS, AND WORKING APPARATUS FOR FIXING LENS

FIELD OF THE INVENTION

The present invention relates to a lens barrel used in optical apparatuses such as a projector, a method for fixing a lens in the lens barrel, and a working apparatus for fixing the lens in the lens barrel.

BACKGROUND OF THE INVENTION

Optical systems used in optical apparatuses such as a projector, a digital camera, a film camera and the like are generally composed of a plurality of optical lenses. The optical lenses need to be fixed to their respective holding barrels such that an optical axis of each lens coincides. However, the optical lenses may be decentered when the holding barrels are processed with poor accuracy or the optical lenses are mounted in the holding barrels with poor precision. As a result, an optical performance of the whole optical system is lowered.

In order to prevent the decentering of the optical lenses, in Japanese patent laid-open publication No. 8-327870, a first holding member which holds a first lens group is provided with projections at a predetermined interval (or a predetermined angle) on its outer peripheral surface, and a second holding member which holds a second lens group is provided with projections at a predetermined interval on its inner peripheral surface. The first holding member is fitted into the second holding member such that the projections of the first holding member contact the projections of the second holding member. When the first lens group is decentered, the first holding member is rotated around an optical axis from the state that the projections of the first and second holding members contacting with each other, and thereby the position of the first holding member is adjusted in a plane perpendicular to the optical axis.

In Japanese patent laid-open publication No. 2002-196204, when a connecting plate fixed to a first holding member which holds a first optical lens, and a second holding member which holds a second optical lens are fixed by using a plurality of screws, each screw is firstly penetrated through one of through holes of the second holding member and through a spring washer. The screw is then threaded into a screw hole of the connecting plate. When the screws are used for a temporary fix, the position of the second holding member is adjusted in a plane perpendicular to an optical axis so as to correct the decentering of the second optical lens. At this time, tilt of the second optical lens held by the second holding member is also adjusted by respectively changing the amount of loosening and tightening of the screws.

However, in the method disclosed in Japanese patent laid-open publication No. 8-327870, the first holding member is attached to the second holding member with contacting each other. When a contact surface of each first and second holding member has low precision, the first lens group held by the first holding member is decentered. Moreover, relative distance from the first lens group to the second lens group changes, and therefore the optical performance of the whole optical system is deteriorated. In the method disclosed in Japanese patent laid-open publication No. 2002-196204, the tilt of the second optical lens is adjusted after the position of the same is adjusted. While changing the amount of loosening the screws, the second holding member may move from the adjusted position in the plane perpendicular to the optical axis. Accordingly, this method is not appropriate for adjusting the decentering of the optical system.

SUMMARY OF THE INVENTION

It is an object of the present invention to provide a lens barrel, a method and a working apparatus for fixing a lens which facilitate centering adjustment of the lens while maintaining the lens position correctly on an optical axis direction.

In order to achieve the above and other objects, a lens barrel of the present invention has a plurality of lenses, and includes a lens holding member and an adhesive. An adjustment lens which is at least one of the plurality of lenses is inserted into the lens holding member. The adjustment lens is contained in the lens holding member without contacting with the lens holding member. The adhesive is filled in a clearance between an edge of the adjustment lens and the lens holding member so as to fix the adjustment lens to the lens holding member.

The lens barrel further includes a ring-shape lens frame which is fitted to the edge of the adjustment lens. The adhesive is filled in a clearance between the lens frame and the lens holding member.

The lens holding member has through holes, and the adhesive is injected via the through holes.

A method of the present invention for fixing a lens to a lens holding member includes the steps of setting the lens holding member to a stationary work holder, setting the lens to a movable work holder, moving the movable work holder toward the stationary work holder so as to insert the lens inside the lens holding member without contacting with an inner wall of the lens holding member, projecting an image through the lens on a screen, moving the movable work holder in at least one of an optical axis direction of the lens and a direction perpendicular to the optical axis so as to adjust position of the lens without contacting with the inner wall of the lens holding member while checking the projected image, and injecting an adhesive in a clearance between the lens and the lens holding member so as to fix the lens in the lens holding member, after the position of the lens is adjusted.

The lens is fitted to a ring-shape lens frame and bonded to the lens holding member through the lens frame. The adhesive is injected via thorough holes formed on an outer periphery of the lens holding member.

A working apparatus of the present invention for fixing a lens to a lens holding member includes a stationary work holder, a movable work holder, a position adjusting mechanism and an injector. The stationary work holder holds the lens holding member. The movable work holder holds a lens frame to which the lens is fitted. The movable work holder is moved toward the stationary work holder. The position adjusting mechanism adjusts position of the movable work holder in at least one of an optical axis direction of the lens and a direction perpendicular to the optical axis so as to move the lens frame without contacting with the lens holding member. The injector injects an adhesive so as to fix the lens in the lens holding member.

The working apparatus further includes a projector which projects a chart image through the lens on a screen.

The movable work holder has a support barrel which is fitted inside a rear end of the lens frame.

The working apparatus further includes a suction device which suctions air inside the support barrel so as to draw the lens to the support barrel.

According to the present invention, the adhesive is filled in the clearance between the lens holding member and the lens or the lens frame, and thereby positioning and fixing of the lens in the lens holding member are both made with the adhesive. Owing to this, centering of the lens can be performed regardless of the processing accuracy of the lens holding member and the lens frame.

According to the method and the working apparatus of the present invention for fixing the lens to the lens holding member, an image is projected through the decentering adjustment lens on the screen, and the centering of the lens is performed with checking the projected image. Owing to this, lens aberration can be reduced.

Moreover, the through holes are formed on the lens holding member, and the edge of the lens or an outer surface of the lens frame is fixed to an inner surface of the lens holding member with the adhesive injected via these through holes. Therefore, it is prevented that the adhesive drips onto the lens surface.

BRIEF DESCRIPTION OF THE DRAWINGS

The above objects and advantages of the present invention will become more apparent from the following detailed description when read in connection with the accompanying drawings, in which:

FIG. 5 is a perspective view illustrating a relationship between the lens frame and a movable work holder.

DETAILED DESCRIPTION OF THE PREFERRED EMBODIMENTS

Figure 1:
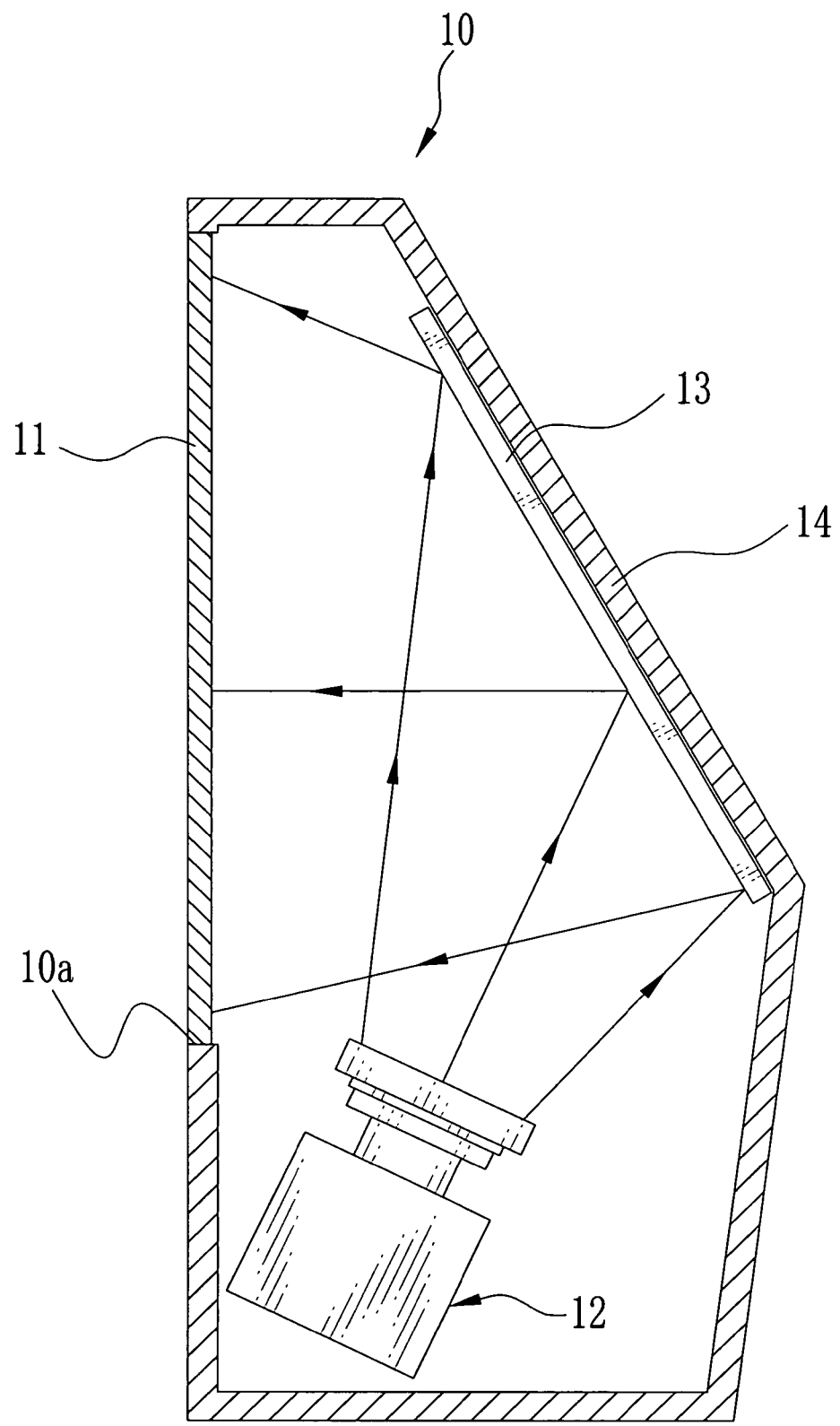
FIG. 1 is a schematic diagram illustrating an inner configuration of a rear projector.

In FIG. 1, a rear projector 10 has a screen 11 of a transmissive type on which an image is projected, a projector unit 12 for outputting image light converted from illumination light, and a mirror 13 for reflecting the image light from the projector unit 12 toward the screen 11.

The projector unit 12 and the mirror 13 are provided inside a case 14, and the screen 11 is provided at an opening portion 10a of the case 14. The screen 11 has a horizontally long rectangular shape. The image light is projected from a rear side of the screen 11, and the image is viewed from its front side. The mirror 13 is a trapezoidal shape having an upper side longer than a lower side, and tilted with respect to the screen 11.

Figure 2:
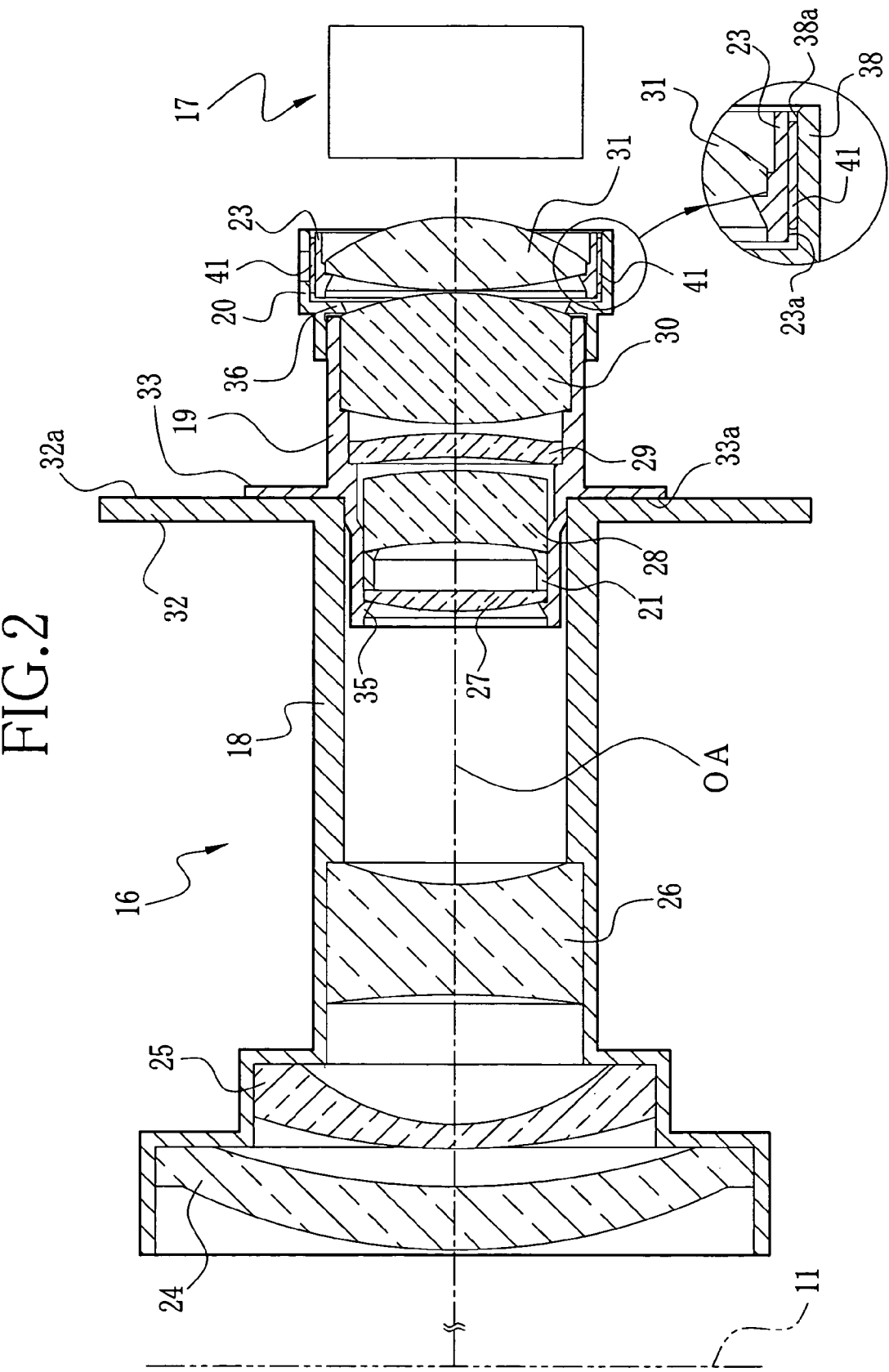
FIG. 2 is a sectional view illustrating a configuration of a projector unit.

As shown in FIG. 2, the projector unit 12 includes a lens barrel 16 and an image light producer 17. The image light producer 17 is composed of a light source, a rod integrator and a liquid crystal display (LCD). The rod integrator uniforms energy distribution of the illumination light from the light source. The LCD optically modulates the illumination light. The lens barrel 16 projects the image light from the image light producer 17 onto the screen 11.

The lens barrel 16 is composed of a first holding barrel 18, a second holding barrel 19, a third holding barrel 20, a first spacer ring 21, a lens frame 23 and first to eighth lens groups 24 to 31. The first holding barrel 18 holds the first, second and third lens groups 24, 25 and 26, in this order from the screen side. Note that a numeral 32 represents a flange whose rear surface 32a contacts with an attachment surface 52a of a stationary work holder 52 of a working apparatus 50 (see FIG. 4). Note that a numeral OA represents an optical axis of the lens barrel 16.

The second holding barrel 19 attached to a rear end of the first holding barrel 18 holds the fourth, fifth, sixth and seventh lens groups 27, 28, 29 and 30, in this order from the screen side. A projection 35 is formed at a front end, inside of the second holding barrel 19. The fourth lens group 27, the first spacer ring 21 and the fifth to seventh lens groups 28 to 30 are inserted into the second holding barrel 19 in this order. A numeral 33 represents a flange. A front surface 33a of the flange 33 contacts with the rear surface 32a of the flange 32 of the first holding barrel 18.

As shown in FIG. 2, the third holding barrel 20 is attached to a rear end of the second holding barrel 19. A projection 36 is formed in the approximately middle of the third holding barrel 20 in a longitudinal direction thereof, and protrudes inwardly. When the third holding barrel 20 is attached to the rear end of the second holding barrel 19, the projection 36 of the third holding barrel 20 presses the seventh lens group 30.

Figure 3:
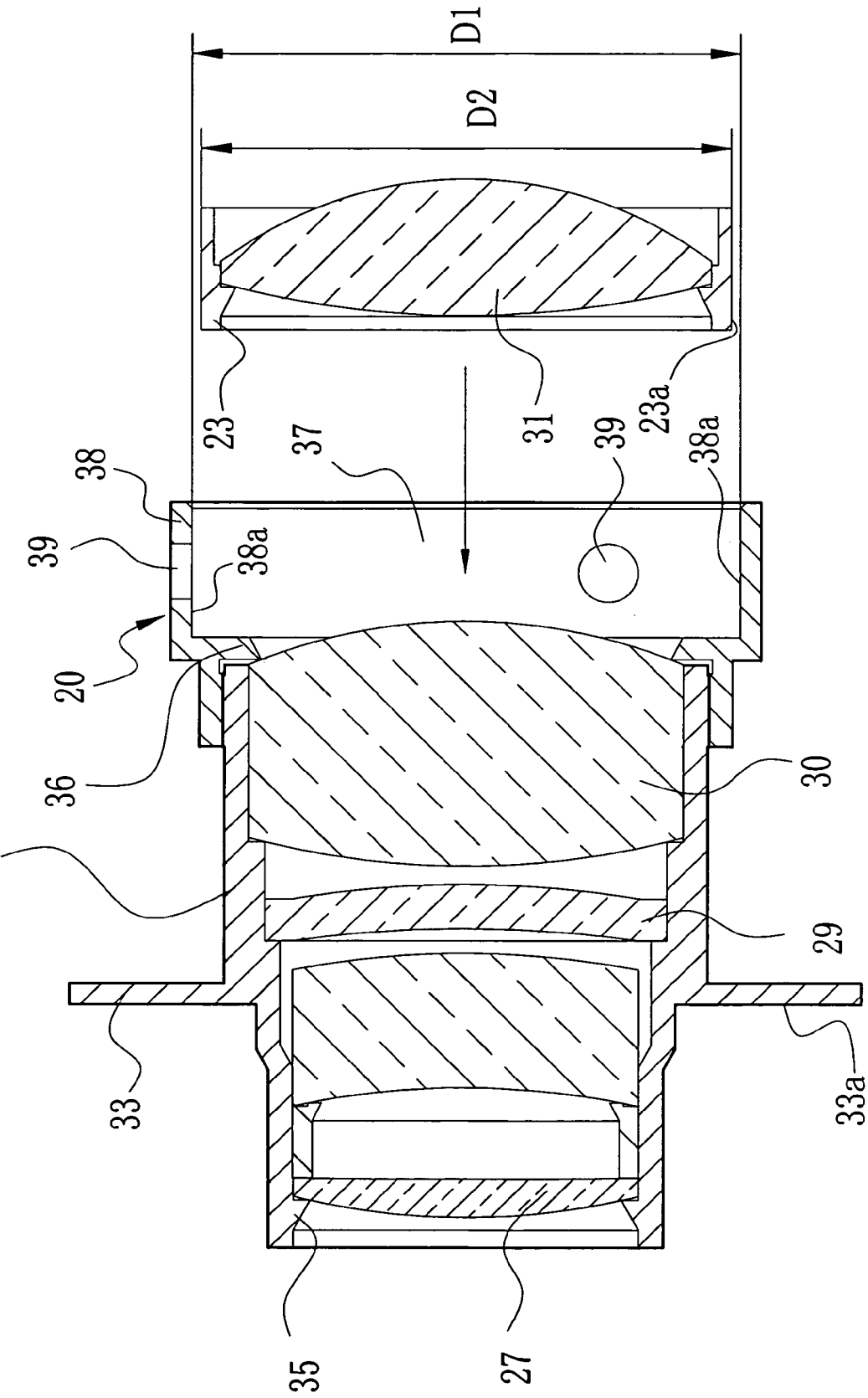
FIG. 3 is a sectional view illustrating a vicinity of a third holding barrel.

As shown in FIG. 3, the third holding barrel 20 has a containing portion 37 for containing the cylindrical lens frame 23 holding the eighth lens group 31. In this embodiment, the eighth lens group 31 works as a decentering adjustment lens. A peripheral wall 38 forming the containing portion 37 has, for example, three openings 39 formed at 120 degree intervals. Through these openings 39, an adhesive 41 such as a UV adhesive is filled. Owing to this, an inner peripheral surface 38a of the peripheral wall 38 forming the containing portion 37 and an outer peripheral surface 23a of the lens frame 23 are bonded together. Note that the number of the openings 39 is not limited to three, but four or six openings may be formed. A diameter D1 of the inner periphery of the peripheral wall 38 is larger than a diameter D2 of the outer periphery of the lens frame 23.

Figure 4:
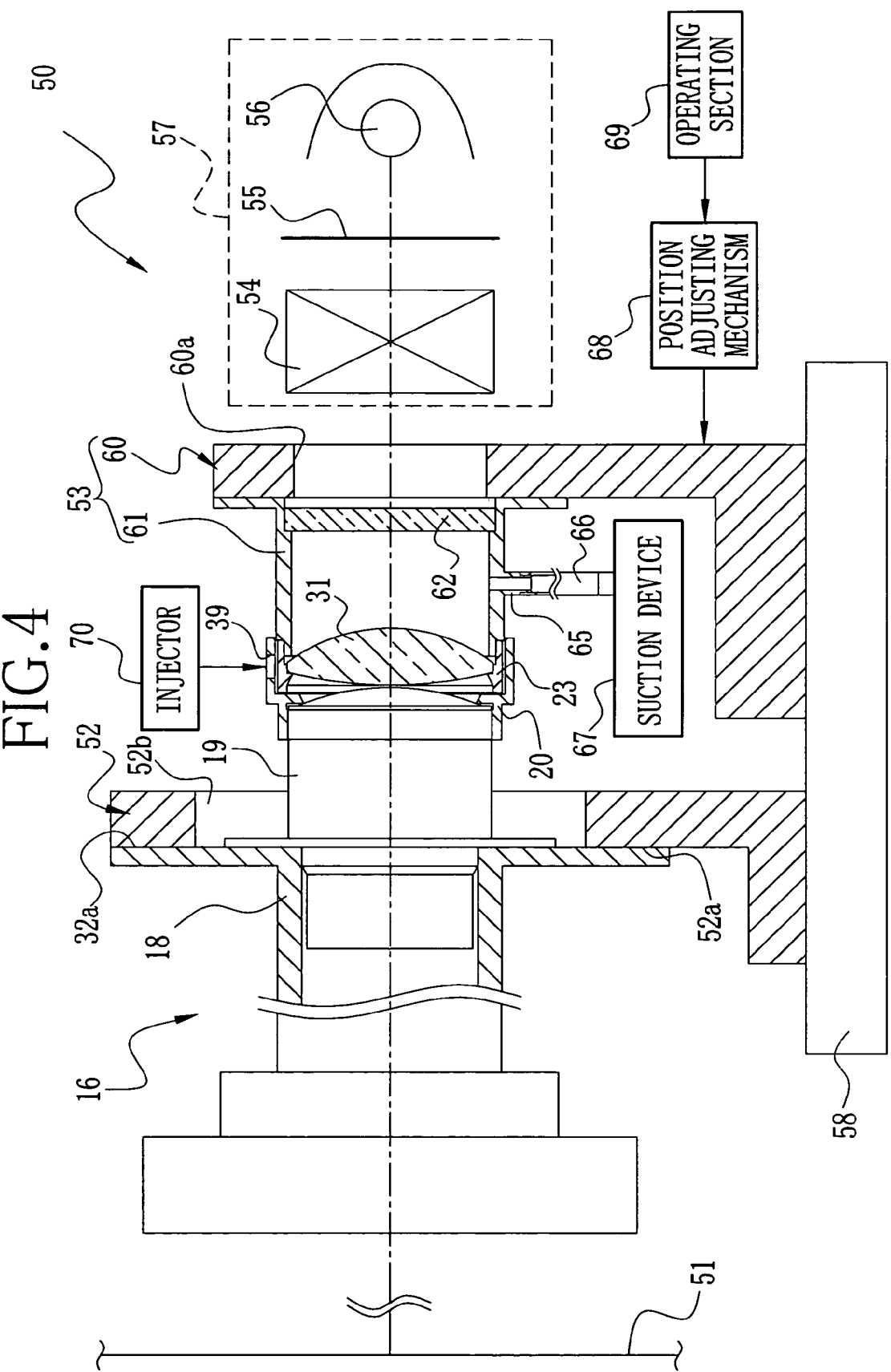
FIG. 4 is a schematic sectional view illustrating a working apparatus for fixing a lens, by which a lens frame holding an eighth lens group is assembled in the third holding barrel.

In FIG. 4, the working apparatus 50 is composed of a screen 51, the stationary work holder 52, a movable work holder 53, a prism 54, a chart 55, a light source 56 and a bed 58. The stationary work holder 52 holds the first holding barrel 18, and the movable work holder 53 holds the lens frame 23.

The attachment surface 52a of the stationary work holder 52 is a reference surface. The first holding barrel 18 is positioned and fixed on the stationary work holder 52 in a state that the rear surface 32a of the flange 32 of the first holding barrel 18 is in contact with the attachment surface 52a. In order to fix the first holding barrel 18, holes may be formed on the flange 32, and screws are penetrated through the holes and then threaded within the stationary work holder 52. The first holding barrel 18 may be fixed with the use of other holding members such as clips. The stationary work holder 52 has an opening 52b through which the second holding barrel 19 held by the first holding barrel 18 is inserted.

The movable work holder 53 has an L-shaped base 60 to which a cylindrical support barrel 61 is mounted. The movable work holder 53 is mounted to the bed 58 through a position adjusting mechanism 68. The position adjusting mechanism 68 has a known lift mechanism and an XY slide mechanism to move the movable work holder 53 in a direction parallel to the optical axis OA which is X axis direction, in directions perpendicular to the optical axis OA which are Y and Z axes directions, by operating an operating section 69 such as control dials. The base 60 of the movable working holder 53 has an opening 60a. The support barrel 61 is attached to the base 60 such that central axes of the opening 60a and the support barrel 61 coincide with each other.

To a rear end side of the support barrel 61, a glass plate 62 is attached, and a front end of the support barrel 61 is provided with a fitting portion 61a to which the lens frame 23 is fitted. The fitting portion 61a is in a ring shape and has an external diameter D3 equal to or smaller than an inner diameter D4 of the lens frame 23 (see FIG. 5).

The support barrel 61 is provided with a pipe 65 for air bleeding. The pipe 65 is connected to a suction device 67 such as a vacuum pump through a tube 66. Since air is suctioned by the suction device 67, the lens frame 23 is held so as not to slip off from the fitting portion 61a.

By moving the movable work holder 53, optical axes of the first to third lens groups 24 to 26 held by the first holding barrel 18, the fourth to seventh lens groups 27 to 30 held by the second holding barrel 19 which is attached to the first holding barrel 18, and the eighth lens group 31 held by the lens frame 23 are almost aligned.

Figure 6:
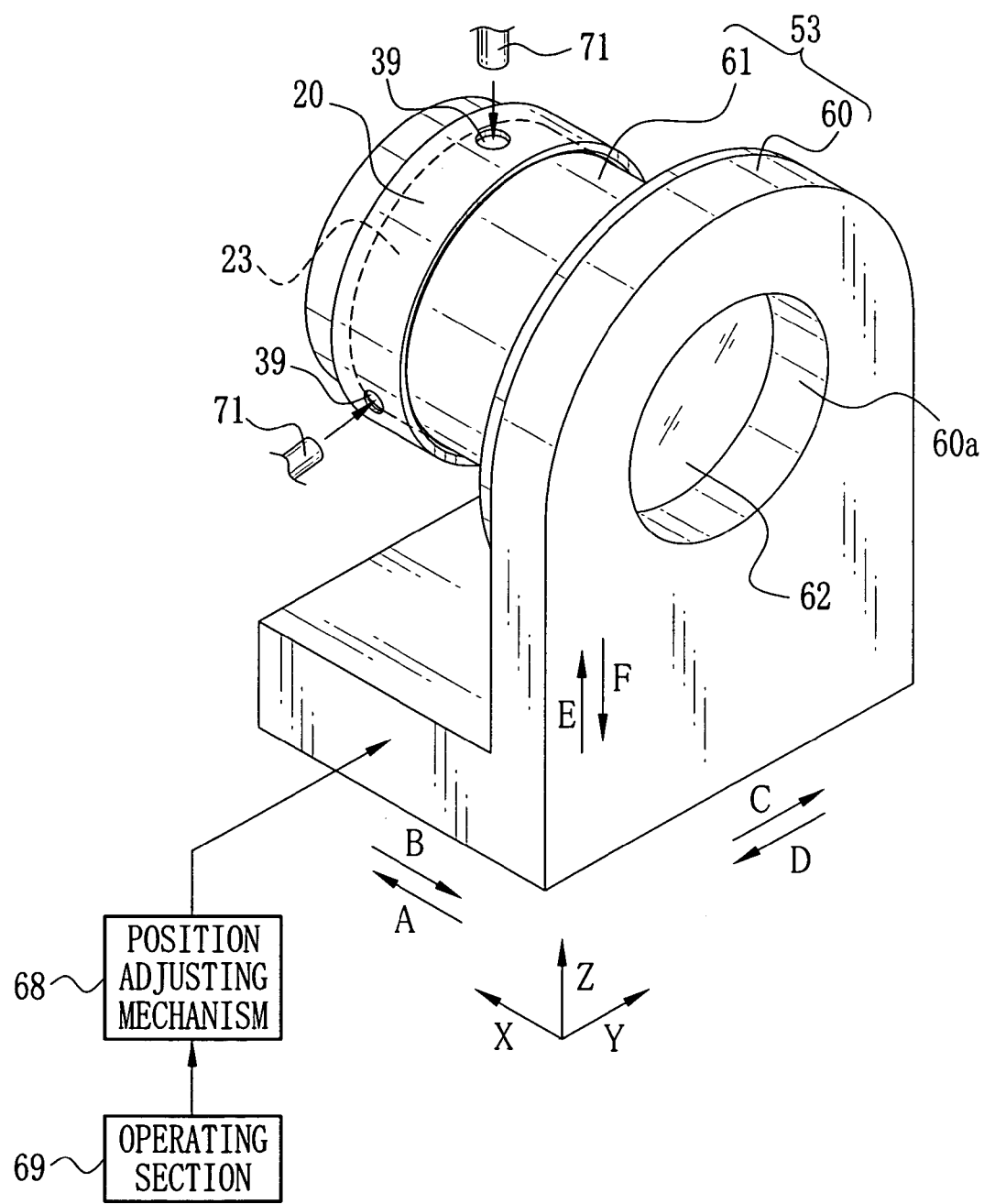
FIG. 6 is a perspective view illustrating directions for adjusting position of the movable work holder.

An injector 70 injects the adhesive 41 for fixing the lens frame 23 positioned by the position adjusting mechanism 68 to the third holding barrel 20 through the openings 39 of the third holding barrel 20. The injector 70 has, for example, nozzles 71 (see FIG. 6). After the nozzles 71 are moved to the openings 39, the injector 70 injects the adhesive 41 through the openings 39. Note that, for example, the UV adhesive is used as the adhesive 41.

A light source box 57 containing the prism 54, the chart 55 and the light source 56 is located behind the movable work holder 53. The chart 55 is, for example, a film having patterns or marks recorded thereon. The illumination light from the light source 56 firstly passes through the chart 55, and then passes through the prism 54, the eighth lens group 31, the seventh lens group 30, . . . the second lens group 25 and the first lens group 24 in this order to be projected on the screen 51. Note that the chart 51 is not limited to the film on which the patterns or marks are recorded. The chart 51 may be, for example, a transmissive LCD panel or a glass plate.

Next, an assembly of the lens barrel 16 is explained. After the fourth lens group 27, the first spacer ring 21 and the fifth to seventh lens groups 28 to 30 are mounted in the second holding barrel 19, the second holding barrel 19 is fixed to the first holding barrel 18 holding the first to third lens groups 24 to 26, with the screws or the like. Thereafter, the first holding barrel 18 is fixed to the stationary work holder 52.

As shown in FIG. 5, the lens frame 23 holding the eighth lens group 31 is fitted to the fitting portion 61a of the support barrel 61. The rear end of the support barrel 61 is sealed with the glass plate 62 and the front end of the same is sealed with the eighth lens group 31. Owing to this, when the air inside the support barrel 61 is suctioned by the suction device 67, the eighth lens group 31 is kept in a certain position with respect to the support barrel 61.

The movable work holder 53, which holds the eighth lens group 31 in the lens frame 23 by suctioning, is moved to the stationary work holder 52, and the lens frame 23 is inserted to the containing portion 37 of the third holding barrel 20. Since the inner diameter D1 of the peripheral wall 38 of the containing portion 37 is larger than the outer diameter D2 of the lens frame 23 holding the eighth lens group 31, the lens frame 23 does not contact with the peripheral wall 38 of the containing portion 37. When the light source 56 is turned on at this state, the chart 55 is illuminated.

The image light passes thorough the prism 54, the glass plate 62, the eighth lens group 31, the seventh lens group 30, . . . the second lens group 25 and the first lens group 24, and reaches the screen 51. Since a chart image is formed on the screen 51, an operator adjusts the position of the eighth lens group 31 by operating the operating section 69 while checking this image. When the operating section 69 is operated, the movable work holder 53 is moved in the X axis direction (A or B direction in FIG. 6), Y axis direction (C or D direction in FIG. 6) or Z axis direction (E or F direction in FIG. 6), with holding the eighth lens group 31. Note that the position adjustment of the eighth lens group 31 is performed within the range that the lens frame 23 does not contact with the inner peripheral surface 38a of the peripheral wall 38 forming the containing portion 37.

The position adjustment of the eighth lens group 31 completes when the center of the chart image is projected at a predetermined position on the screen 51. At this state, the optical axes of the first to third lens groups 24 to 26 held by the first holding barrel 18, the fourth to seventh lens groups 27 to 30 held by the second holding barrel 19 which is attached to the first holding barrel 18, and the eighth lens group 31 held by the lens frame 23 are almost aligned. At the time of this centering operation, the position of the eighth lens group 31 is adjusted on the optical axis direction such that, for example, field curvature of the projected image is reduced and the chart image appears most clearly.

After the adjustment of the eighth lens group 31, the nozzles 71 of the injector 70 are moved to the openings 39 of the third holding barrel 20. The injector 70 then injects the adhesive 41 which is the UV adhesive through the openings 39 to fill a clearance provided between the lens frame 23 and the peripheral wall 38 forming the containing portion 37. Thereafter, the filled adhesive 41 is cured by UV light irradiated from a UV light source (not shown) through the openings 39. In this way, the lens frame 23 is fixed to the third holding barrel 20, thereby the assembling of the lens barrel 16 is completed. The assembled lens barrel 16 is incorporated in the projector unit 12.

According to the present embodiment, the three-axes adjustment of the eighth lens group 31 is performed by moving the movable work holder 53 in the X, Y and Z directions. However, it is also possible to perform the six-axes adjustment by rotating the movable work holder 53 around the axes of X, Y and Z. Owing to this, it is also possible to adjust the tilt of the eighth lens group 31 besides adjusting the position thereof.

It is also possible to form grooves or recesses on the outer peripheral surface of the lens frame 23. For this configuration, areas for contacting the adhesive are increased, and therefore the lens frame 23 and the third holding barrel 20 can be fixed more firmly.

According to the present embodiment, the lens held by the lens frame is bonded to the holding barrel. However, the present invention is not limited to this. For example, the present invention is also applicable in directly bonding the lens to the holding barrel.

In addition, the lens barrel of the present embodiment has the first to third holding barrels, but the lens barrel may have only one holding barrel.

According to the present embodiment, the rear projector is explained as an example. The present invention is also applicable to the lens barrel used in front type projectors which project images from a front side of the screen, digital cameras, film cameras or the like. Moreover, in the present embodiment, the position adjustment is applied only to the eighth lens group, but the present invention is not limited to this.

Various changes and modifications are possible in the present invention and may be understood to be within the present invention.

What is claimed is:

1. A lens barrel having a plurality of lenses comprising:
a lens holding member into which an adjustment lens is inserted, said adjustment lens which is at least one of said plurality of lenses being contained in said lens holding member without contacting with said lens holding member;
an adhesive for fixing said adjustment lens to said lens holding member, said adhesive being filled in a clearance between an edge of said adjustment lens and said lens holding member; and
a ring-shape lens frame fitted to said edge of said adjustment lens, said adhesive being filled in a clearance between said lens frame and said lens holding member.

2. A lens barrel described in claim 1, wherein said lens holding member has through holes, and said adhesive is injected via said through holes.

3. A lens barrel described in claim 1, wherein said lens holding member has a containing portion for containing said ring-shape lens frame.

4. A lens barrel described in claim 3, wherein a peripheral wall forms said containing portion and has through holes for injecting adhesive via said through holes.

5. A lens barrel described in claim 3, wherein said adhesive bonds an inner peripheral surface of a peripheral wall forming said containing portion, and an outer peripheral surface of said ring-shape lens frame.

* * * * *